2,552,732

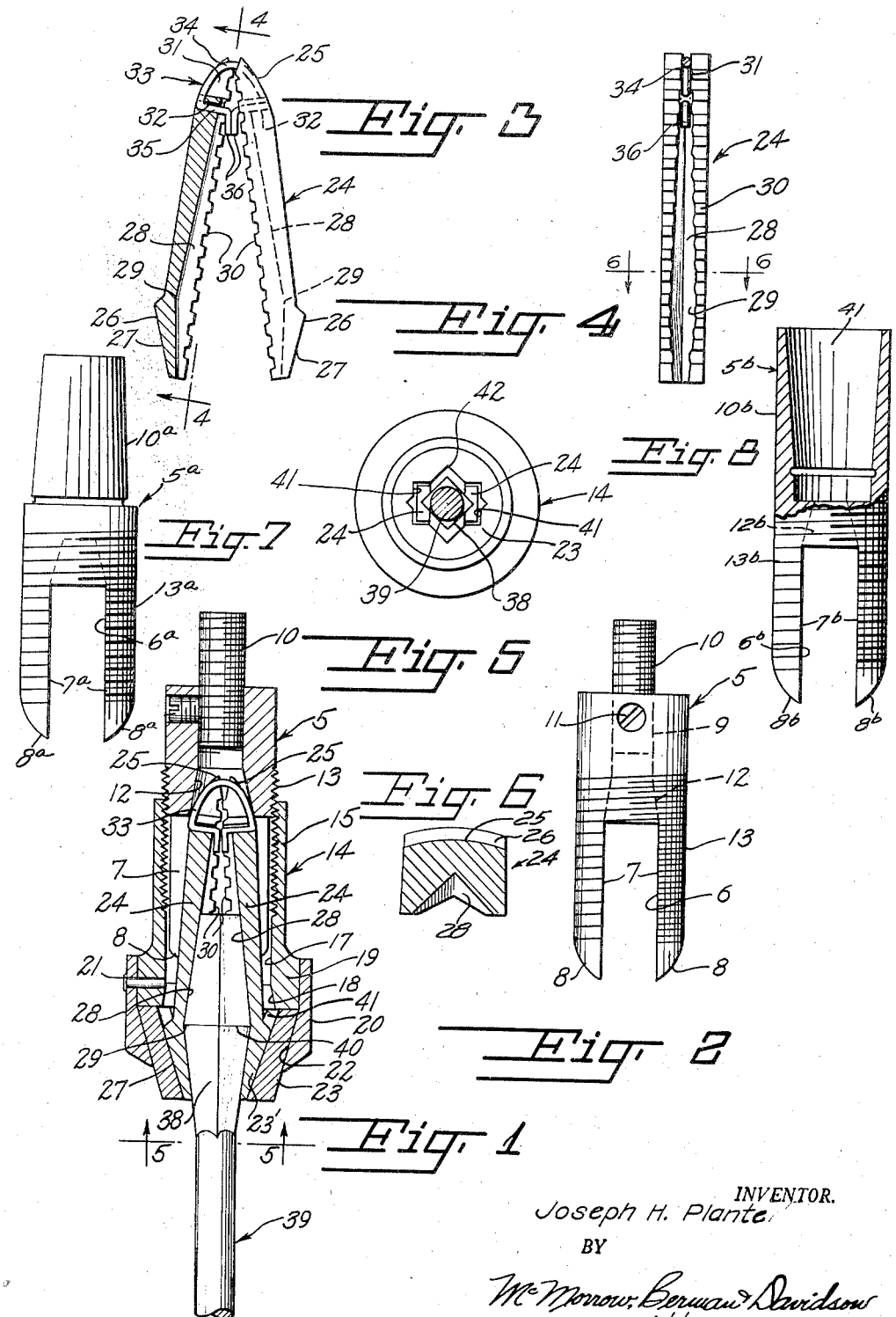
May 15, 1951     J. H. PLANTE     2,552,732
CHUCK DEVICE
Filed June 8, 1948
INVENTOR.
Joseph H. Plante
BY
McMorrow, Berman & Davidson
Attorneys Patented May 15, 1951

UNITED STATES PATENT OFFICE 2,552,732

CHUCK DEVICE

Joseph H. Plante, Chisholm, Maine

Application June 8, 1948, Serial No. 31,717

3 Claims. (Cl. 279—56)

This invention relates to an improved chuck device for hand and power drills and drill presses, enabling the use therewith of squared shank auger bits, the primary object of the invention being to provide a chuck device for a drill enabling using the same drill for both metal drilling and wood boring, without providing special auger bits or mutilating existing auger bits.

Another important object of the invention is to provide an efficient and well-balanced chuck device of the above-indicated character which is simple and rugged in construction and is capable of being manufactured at relatively low cost.

Another important object of the invention is the provision of a chuck device of the above-indicated character which is applied to the drill simply by removing the existing drill chuck and replacing it with the combination chuck; and which is easily and simply operable for securely and accurately holding the relatively large squared shanks of auger bits.

Other important objects and advantageous features of this invention will be apparent from the following description and the accompanying drawings, wherein for purposes of illustration only, a specific embodiment of the invention is set forth in detail.

In the drawings:

Figure 1 is a general transverse vertical section showing an augur bit held in the chuck.

Figure 2 is a side elevation of the chuck body.

Figure 3 is a side elevation of the chuck jaws in assembled relation, with one of the jaws partly in section.

Figure 4 is a vertical transverse section taken on the line 4—4 of Figure 3.

Figure 5 is a horizontal section taken on the line 5—5 of Figure 1.

Figure 6 is a horizontal section taken on the line 6—6 of Figure 4.

Figure 7 is a side elevation similar to Figure 2, showing another form of chuck body, having an arbor taper integral therewith.

Figure 8 is a view similar to Figure 7, showing another form of chuck body for use with an arbor taper.

Referring in detail to the drawings, the illustrated chuck comprises a generally cylindrical body 5 longitudinally slotted from its lower end, as indicated at 6, to define two similar parallel legs 7, 7 rounded at their lower ends 8, and provided with an axial bore 9 opening through its upper end to receive the stud 10 by which the chuck is mounted to the drill shaft (not shown). A set screw 11 traversing the body 5 locks the stud 10 in place in the bore 9. The lower part of the bore 9 is flared, as indicated at 12, to substantially the width of the space between the legs 7. Approximately the lower two-thirds of the body 5 is provided with an external screw-thread 13.

The body 5 is threaded into a barrel, generally designated 14, having an internal screw-thread 15 extending downwardly therein from its upper end to its mid point, as shown in Figure 1, the remainder of the bore of the barrel being smooth, as indicated at 17, and slightly flared at its lower end, as indicated at 18. The lower end of the barrel is expanded, as indicated at 19, and has sleeved thereon an annular retainer 20 locked in place by a pin 21. The lower interior part of the retainer 20 is tapered or beveled, as indicated at 22, to rotatively confine against the lower end of the barrel 14 an inverted frusto-conical annular wedge element 23.

Loosely and slidably confined in the enclosure formed by the assembled body 5 and barrel 14 are the two cooperating similar jaws 24, 24. Each jaw comprises an elongated, generally rectangular cross-section bar, with the outer side of the upper end rounded, as indicated at 25, and with the outer side of its lower end somewhat laterally expanded, as indicated at 26, and provided with a plane angulated face 27 to slide upon the tapered interior surface 23′ of the wedge element 23, as shown in Figure 1. The inner side of the jaw is formed with a longitudinal squared channel 28 which is graduated in depth and in width from each end of the jaw to a point 29 immediately above the expanded lower portion 26, as indicated in dotted lines in Figure 3 and in full lines in Figure 4. The lateral inward edges of the walls of the channels 28 are castellated, as indicated at 30.

The jaws 24, 24 are slotted through their upper ends at 31, and are provided with transverse holes 32 below the slots, to accommodate the assembly spring ring 33, which includes a generally semicircular part 34 loosely arranged in and between the slots 31, 31, the radial portions 35 projecting laterally inwardly through the holes 32, and the downturned retaining portions 36, 36 extending downwardly between the jaws, as shown in Figure 3. This arrangement holds the upper ends of the jaws close enough to each other for assured engagement of the castellations in a manner hereinafter described.

In the completely assembled chuck the jaws 24, 24, positioned between the body legs 7, have their rounded upper ends 25, 25 seated, as shown in Figure 1, in the flared lower bore part 12 of the body 5, with the spring ring 33 holding the lower ends of the jaws apart, with the lower plane jaw surfaces 27 slidably engaged with the inner surface 23' of the frusto-conical wedge element 23. When the barrel 14 is rotated by hand in one direction, it will ride up along the body 5 and thereby raise the wedge element, with the upper ends of the jaws 24, 24 halted by engagement with the flared portion 12 of the body 5, so that the castellations 30 at the upper ends of the jaws 24, 24 interengage to lock the jaws against shifting relative to each other and the lower ends of the jaws are compressed toward each other to grip the squared shank 38 of an auger bit 39 inserted therebetween. The usual expanded portion 40 on the bit shank fits the points 29 of maximum depth of the jaw channels 28, 28, so that the auger bit shank is substantially conformably gripped in the channels of the jaws and the oppositely-angulated engaged surfaces of the jaws and the auger bit shank preclude relative lengthwise movement of the bit relative to the chuck, so that the auger bit is securely and accurately held. The element 23 has diametrically-opposed slots 41 slidably receiving the lower ends of the jaws 24, 24 and angular channels 42, 42 between the slots 41, 41 to provide clearance for the adjacent edges of the auger bit shank, as shown in Figure 4.

To remove the auger bit 39 from the chuck, the barrel 14 is rotated in the opposite direction to move the barrel down along the body 5, thereby permitting the jaws 24, 24 to open and release the bit shank 38.

Two additional forms of chucks 5a and 5b, respectively, are shown in Figures 7 and 8.

The chuck 5a of Figure 7 has, instead of the stud 10, a tapered integral, relatively large diameter stud 10a adapted to be operatively inserted in the corresponding opening of a lathe fitting, not shown.

The chuck 5b of Figure 8, has, instead of the stud 10, a full diameter extension 10b of the chuck body, formed with a tapered axial recess 41 adapted to receive a lathe arbor taper, not shown.

These alternate forms of chucks extend the use of the device of the present invention to employment in lathes, as well as different types of hand and press drills for boring and drilling with augers.

I claim:

1. An auger bit chuck comprising a body having means on its upper end for connection to means for axially rotating the chuck, said body being formed with a longitudinal opening in its lower end extending through the opposite sides of said body, a pair of channel jaws positioned in said opening and depending below the lower end of said body, a barrel telescoped on said body for longitudinal movement relative thereto, an annular wedge on the lower end of said barrel operatively engaging the lower ends of said jaws, spring means in the upper part of said opening engaging the upper ends of said jaws and having terminals positioned against the inner faces of said jaws, said terminals being outwardly tensioned with respect to each other whereby the lower ends of said jaws are yieldably spread into operative engagement with said annular wedge.

2. An auger bit chuck comprising a body having means on its upper end for connection to means for axially rotating the chuck, said body being formed with a longitudinal opening in its lower end extending through the opposite sides of said body, a pair of channel jaws positioned in said opening and depending below the lower end of said body, a barrel telescoped on said body for longitudinal movement relative thereto, an annular wedge on the lower end of said barrel operatively engaging the lower ends of said jaws, spring means in the upper part of said opening engaging the upper ends of said jaws and having terminals positioned against the inner faces of said jaws, said terminals being outwardly tensioned with respect to each other whereby the lower ends of said jaws are yieldably spread into operative engagement with said annular wedge, said spring means comprising a spring ring having a semi-circular portion positioned between the upper ends of said jaws and seated in notches formed in facing portions of the upper ends of said jaws.

3. An auger bit chuck comprising a body having means on its upper end for connection to means for axially rotating the chuck, said body being formed with a longitudinal opening in its lower end extending through the opposite sides of said body, a pair of channel jaws positioned in said opening and depending below the lower end of said body, a barrel telescoped on said body for longitudinal movement relative thereto, an annular wedge on the lower end of said barrel operatively engaging the lower ends of said jaws, spring means in the upper part of said opening engaging the upper ends of said jaws and having terminals positioned against the inner faces of said jaws, said terminals being outwardly tensioned with respect to each other whereby the lower ends of said jaws are yieldably spread into operative engagement with said annular wedge, said spring means comprising a spring ring having a semi-circular portion positioned between the upper ends of said jaws and seated in notches formed in facing portions of the upper ends of said jaws, said terminals constituting extensions on the opposite ends of said semi-circular portion.

JOSEPH H. PLANTE.

REFERENCES CITED

The following references are of record in the file of this patent:

UNITED STATES PATENTS

| Number | Name | Date |
|---|---|---|
| 1,095,672 | Quinlan | May 5, 1914 |
| 1,175,879 | Blot | Mar. 14, 1916 |
| 1,679,299 | Fegley | July 31, 1928 |
| 1,745,302 | Jones | Jan. 28, 1930 |
| 1,880,521 | Stowell | Oct. 4, 1932 |